United States Patent
Dowd

(10) Patent No.: US 7,875,823 B1
(45) Date of Patent: Jan. 25, 2011

(54) PROCESS FOR ASSEMBLING A HIGH SPEED HOLLOW ROTOR SHAFT

(75) Inventor: Adam Dowd, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 459 days.

(21) Appl. No.: 11/999,617

(22) Filed: Dec. 6, 2007

Related U.S. Application Data

(60) Provisional application No. 60/963,084, filed on Aug. 2, 2007.

(51) Int. Cl.
*B23K 31/02* (2006.01)

(52) U.S. Cl. .................................. 219/61; 29/DIG. 13

(58) Field of Classification Search ............... 219/59.1, 219/60 A, 60 R, 60.2, 61, 61.12, 61.7; 464/183; 415/115; 416/97 R; 29/DIG. 13
See application file for complete search history.

(56) References Cited

U.S. PATENT DOCUMENTS

| | | | |
|---|---|---|---|
| 2,912,221 A | * | 11/1959 | Chamberlin ................ 415/115 |
| 3,542,991 A | * | 11/1970 | Lindquist ..................... 219/61 |
| 4,711,008 A | | 12/1987 | Nakamura |
| 5,672,286 A | * | 9/1997 | Seeds ........................ 219/61 X |
| 6,749,518 B2 | | 6/2004 | Carrier et al. |

* cited by examiner

*Primary Examiner*—Greg Binda
(74) *Attorney, Agent, or Firm*—John Ryznic

(57) ABSTRACT

A hollow rotor shaft for use in a small twin spool gas turbine engine in which the hollow rotor shaft is assembled by welding two hollow shaft sections together to form the single shaft assembly. One of the hollow shaft sections includes a lip that functions to form a snug fit prior to welding and also functions as a weld filler material. The hollow shaft ends each include a hole to allow for pressure equalization during the welding process to prevent bulging of the hollow shaft. To ensure a full penetration weld, an orbital welding process is used while passing an insert gas such as argon through the hollow shaft to minimize the buildup of material on the inner surface of the weld from the welding process. The shaft ends are pre-heated prior to welding. An insert gas is passed through the inner surface of the shaft sections during welding to prevent buildup of material on the inner surface of the hollow rotor shaft. After welding, material is removed from the outer surfaces of the shaft sections to form the outer surface of the hollow rotor shaft. And, then heat treatment at a high temperature while cooling the shaft with the insert gas occurs. Then, a second heat treatment at about half the first temperature occurs while also passing the insert gas through the shaft for cooling. The welded and heat treated hollow shaft is then balanced by removing material from around the holes.

28 Claims, 5 Drawing Sheets

PROCESS FOR ASSEMBLING A HIGH SPEED HOLLOW ROTOR SHAFT

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is herein incorporated by reference.

GOVERNMENT LICENSE RIGHTS

This invention was made with Government support under Contract No. W31P4Q-05-C-R003 awarded by the US Army. The Government has certain rights in the invention.

This application is also related to U.S. Regular application Ser. No. 11/903,553 filed on Sep. 21, 2007 and entitled HIGH SPEED ROTOR SHAFT FOR A SMALL TWIN SPOOL GAS TURBINE ENGINE; and related to U.S. Regular utility application Ser. No. 11/903,555 filed on Sep. 21, 2007 and entitled HIGH SPEED ROTOR SHAFT AND TURBINE ROTOR DISK ASSEMBLY; and related to U.S. Regular utility application Ser. No. 11/903,554 filed on Sep. 21, 2007 and entitled HIGH SPEED ROTOR SHAFT AND COMPRESSOR ROTOR DISK ASSEMBLY; and related to U.S. Regular utility application Ser. No. 11/975,674 filed on Oct. 19, 2007 and entitled LOW PRESSURE TURBINE ROTOR DISK; all the above of which are incorporated herein by reference.

BACKGROUND OF THE INVENTION

1. Field of the Invention

The present invention relates to a process of assembling a hollow rotor shaft, and more specifically to a small twin spool gas turbine engine that uses the hollow high speed rotor shaft.

2. Description of the Related Art Including Information Disclosed Under 37 CFR 1.97 and 1.98

A gas turbine engine is used to power aircraft such as an unmanned aero vehicle (UAV) that includes video reconnaissance aircraft or a cruise missile. For use in a cruise missile, the engine is intended to be used only once and for typically less than one hour of flight time. In a cruise missile, the space to secure the engine and the space to hold the fuel is limited. Improving the fuel efficiency of the engine will allow for less space to store the fuel, or allow for a longer range using the same amount of fuel. For a UAV like a video reconnaissance aircraft, the hover time is the most important factor. A more efficient engine will allow for a longer hover time over the target.

A UAV such as the two described above is typically a small aircraft that requires a power plant of less than 300 pounds thrust, and typically of less than 100 pounds thrust. Up to now, these aircraft have been powered by internal combustion engines—which are low in efficiency—or small single spool gas turbine engines. The small gas turbine engines provide higher fuel efficiency than the internal combustion engines such as the Wankel engine used in the US Army Shadow UAV. A twin spool gas turbine engine is about twice as efficient as a single spool gas turbine engine. However, twin spool gas turbine engines are used in larger thrust producing engines. All present day known twin spool gas turbine engines are much too large to be used in a small UAV such as those described above.

Scaling down a larger twin spool gas turbine engine has significant design problems. In a prior art twin spool gas turbine engine, such as the PW4000 series engine produced by Pratt & Whitney, cannot be scaled down much below the 300 pound thrust range before rotor dynamics problems occur that will cause the rotor shafts to exceed the critical speed. The critical speed is when the third mode falls below the rotor shaft operating speed. The third mode will cause the rotor shaft to self destruct from the infinite-approaching bending stresses that develop from the rotation. Thus, for a small twin spool gas turbine engine to be useful in a small UAV with power under the 300 pound thrust range, a new design is required for the engine.

BRIEF SUMMARY OF THE INVENTION

It is an object of the present invention to provide for a small twin spool gas turbine engine in the thrust range of 300 pounds or less.

It is another object of the present invention to provide for a hollow rotor shaft capable of operating at high rotational speeds well below the critical speed of the rotor shaft in order to eliminate rotor dynamics problems.

It is another object of the present invention to provide for a welding process for a hollow rotor shaft that will limit material buildup on the inner surface of the hollow shaft that cannot be accessed after the multiple piece shaft is welded together.

A process for manufacturing a hollow rotor shaft which is used in a high speed rotational environment of a small twin spool gas turbine engine. In order to allow for a compact spacing between support bearings, the rotor shaft is hollow to provide sufficient strength and rigidity to produce a critical speed well above the operating speed of the hollow rotor shaft. Since the hollow rotor shaft is hollow, the shaft must be made of at least two parts that must be secured together.

The rotor shaft pieces that are joined together include a lip section on the end of one of the pieces to hold the two pieces together in place during the welding process. Two shaft half sections having an inner hollow surface of the shape of the rotor shaft are formed and joined together. Radial holes are formed into both half sections to allow for a gas to pass into and out of the hollow space formed. The hollow shaft is formed from two half sections of metal material with the inner surface of the halve section having the shape of the hollow rotor shaft. The two half sections are joined together using an orbital weld process with an inert gas such as argon being passed through the hollow interior through the radial holes in order to produce a full penetration weld and to limit any weld material buildup on the inner surface of the hollow shaft. Material buildup on the inside of the hollow shaft after the half sections are joined together cannot be removed and would therefore produce rotor dynamic problems. After the two half sections are welded together, the outer surface of the hollow shaft including the bearing support shafts on the ends are machined out of the metal half sections to form the completed hollow rotor shaft. Machining the remainder of the hollow rotor shaft from the bulk metal material after the two pieces are joined together allows for the sold shaft ends to being aligned and therefore the hollow rotor shaft to be balanced. If additional balancing is required, material around the raised portions in which the holes are formed can be machined away on either side of the shaft.

DETAILED DESCRIPTION OF THE INVENTION

Figure 1:
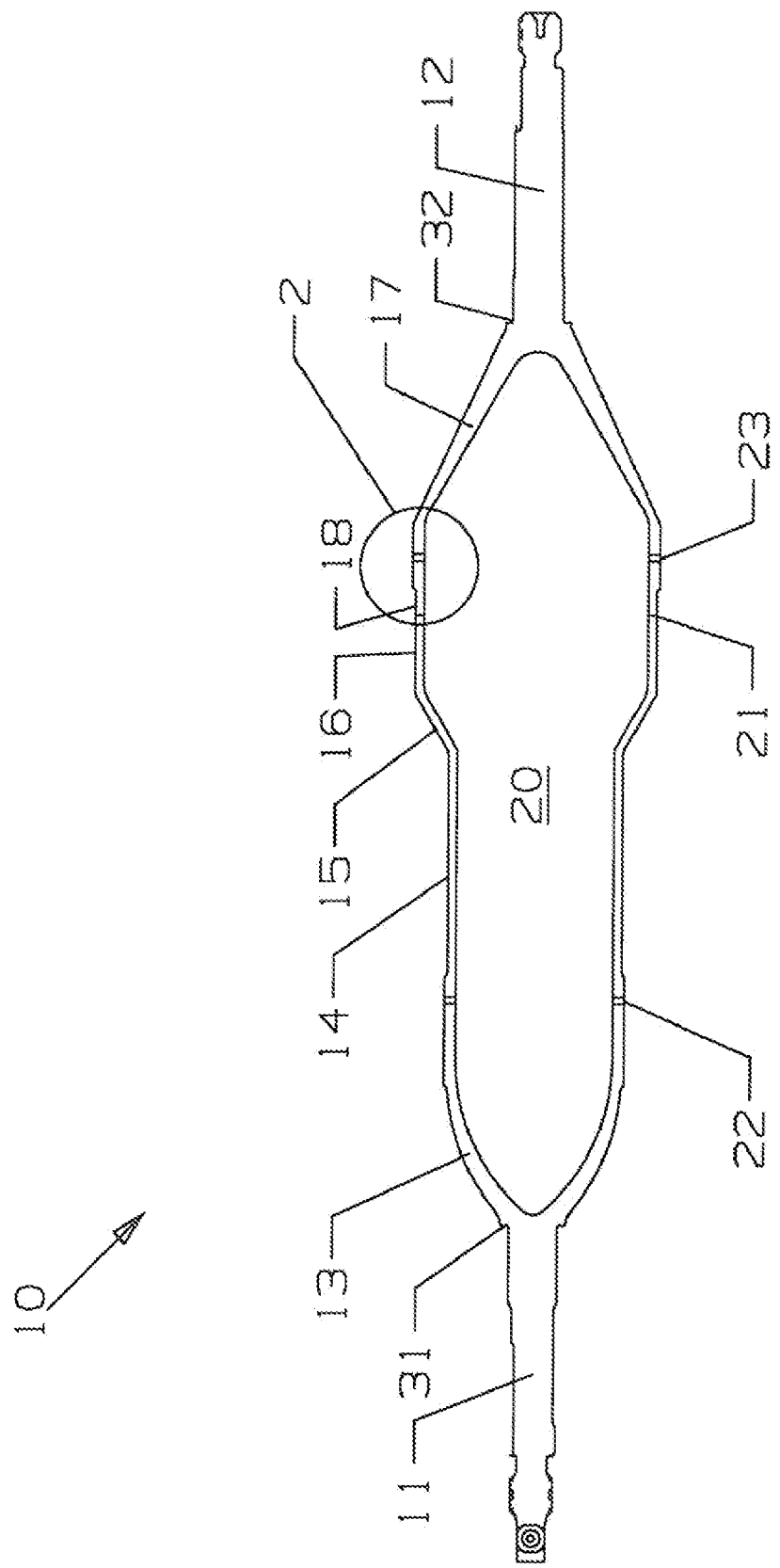
FIG. 1 shows a cross section view of the hollow rotor shaft of the present invention.

FIG. 1 shows a cross section view of the hollow rotor shaft of the present invention. The rotor shaft 10 includes a compressor shaft end 11 and a turbine shaft end 12 with a hollow middle portion forming a hollow interior 20 between the two end shafts 11 and 12. The hollow portion on the compressor shaft end 11 includes a compressor end transition section 13, a small outer diameter section 14, an angled or slanted section 15, and a larger outer diameter section 16. The hollow portion on the turbine shaft end 12 includes a turbine end transition 17 and an outer diameter section 18. The compressor end hollow section and the turbine end hollow section are both joined together at a weld line 21 that is described below. The shaft ends 11 and 12 are shown as solid, but can be mostly solid in that a small diameter axial hole could be formed in the shaft ends to connect the outside to the hollow section 20.

The length of the hollow portion of the rotary shaft between the end shafts is about 4 inches. The wall thickness of the larger outer diameter section 16 and the smaller outer diameter section 14 can be from about 0.030 inches to about 0.050 inches. In the preferred embodiment, the length is from about 0.038 inches to about 0.042 inches in range. The outer diameter section 18 of the turbine shaft end is also the same wall thickness. The outer diameter of the outer diameter section 18 is 1.094 inches to 1.098 inches, and the outer diameter of the smaller outer diameter section 14 is from 0.788 inches to 0.792 inches. The length of the compressor shaft end is 1.50 inches and the length of the turbine shaft end is 1.40 inches. The diameter of the compressor shaft end is 0.22 inches and the diameter of the turbine shaft end is 0.23 inches. The shaft ends are both solid shafts and have blades attached to them with supports for bearings. The rotor shaft of the present invention is made from 410 stainless steel because this material has a very high elasticity to density ratio and maintains the elasticity with little change at high temperatures. In order to provide the rotary shaft with a high critical speed above the operating speed, a material with a high elasticity to density ratio is required.

Figure 3:
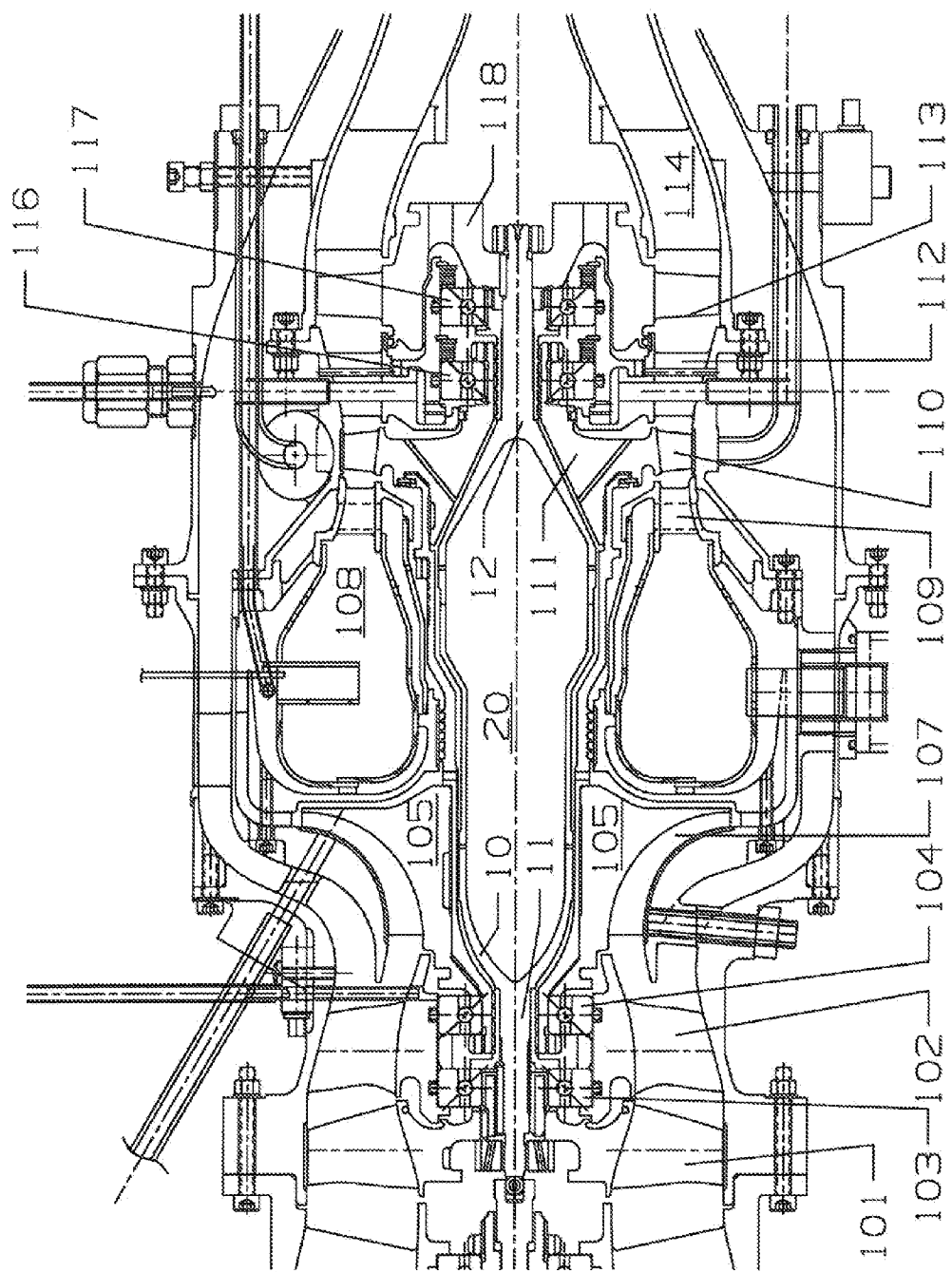
FIG. 3 shows the small twin spool gas turbine engine with the hollow rotor shaft of the present invention.

The compressor end transition piece 13 has a curved wall surface in order to accommodate the small space formed underneath the centrifugal compressor rotor disc 105 in the gas turbine engine as shown in FIG. 3. The turbine end transition piece 17 is slanted in order to fit within the small space formed within the high pressure turbine blade rotor disc 111 as seen in FIG. 3. Also, the smaller outer diameter section 14 has a diameter less than the outer diameter section 16 in order to accommodate the centrifugal compressor rotor disc 105 as shown in FIG. 3. In order to shorten the distance between the two bearings 103 and 117 that support the low speed rotor shaft 10, the low speed rotor shaft 10 had to fit within the spaces formed between the centrifugal compressor rotor disc 105 and the turbine blade rotor disc 111. Extending the distance between the low speed rotor shaft bearings 103 and 117 would lower the critical speed below the operating speed of the shaft and therefore the design would not work.

The low speed rotor shaft 10 of the present invention is designed to have as large of a diameter as possible with the thinnest walls as possible in order to produce a critical speed well above an operating speed of the small engine. The low speed rotor shaft for use in the gas turbine engine of less than 300 pounds thrust must operate at around 116,000 rpm in order to make this small twin spool gas turbine engine operational.

Figure 2:
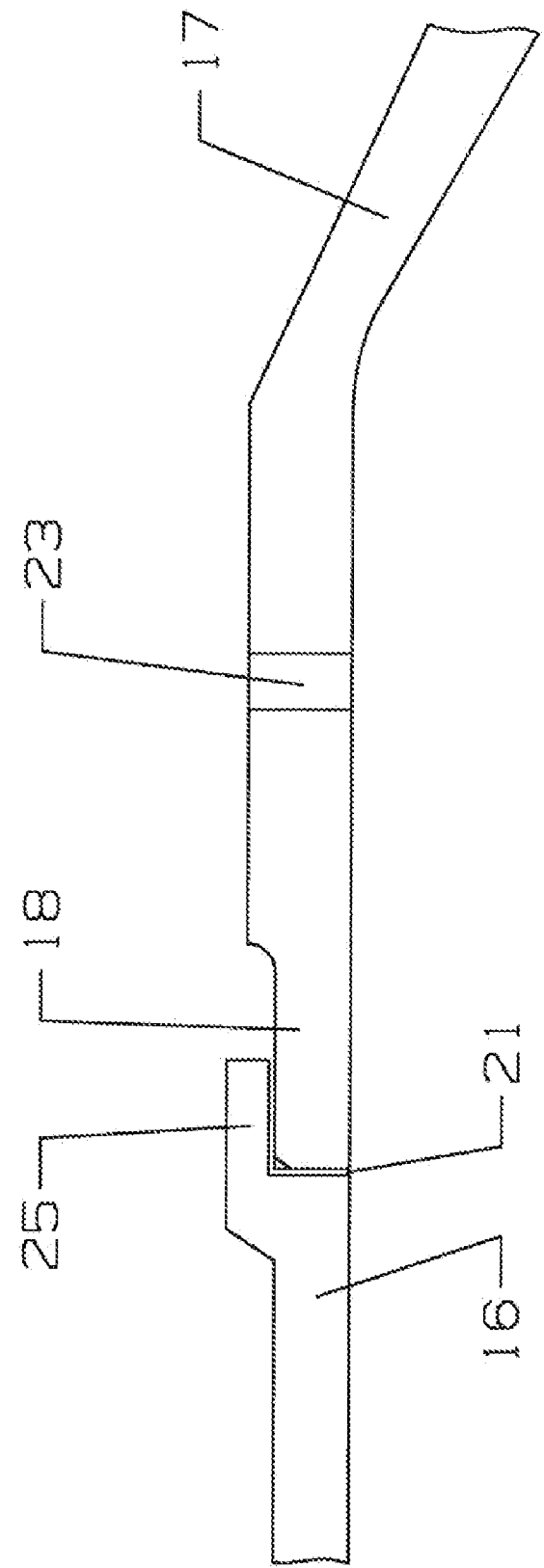
FIG. 2 shows a cross section view of the details of the welded joint used in the hollow rotor shaft of the present invention.

Because the low speed rotary shaft 10 is hollow, the shaft must be made from two parts that are welded together. In FIG. 1 the weld line is shown as 21 which is formed between the two ends of the outer diameter sections 16 and 18 which both sections have the same thickness and outer diameter. FIG. 1 shows a smooth transition between the two outer diameter sections 116 and 118 that is representative of the finished rotary shaft assembly 10. FIG. 2 shows a detailed view of the ends of the outer diameter sections before the weld is applied. The outer diameter section 16 of the compressor shaft end includes a lip 25 that fits over an end of the outer diameter section 18 of the turbine shaft end. The lip 25 is a full annular lip that extends 360 degrees around the hollow section of the compressor shaft end and aids in the alignment of the two hollow sections. The lip 25 is sized and shaped to produce a snug or snap fit with the outer diameter section 18 of the opposed hollow section. The snug fit between the two pieces that will form the rotor shaft helps hold the pieces together during the welding process.

Figure 5A:
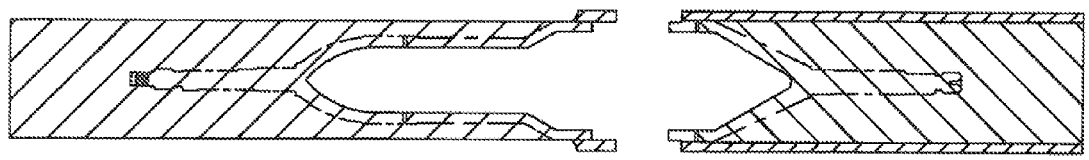
FIGS. 5a through 5d shows cross section views of the stages involved in forming the hollow rotor shaft from the block half sections.
Figure 5B:
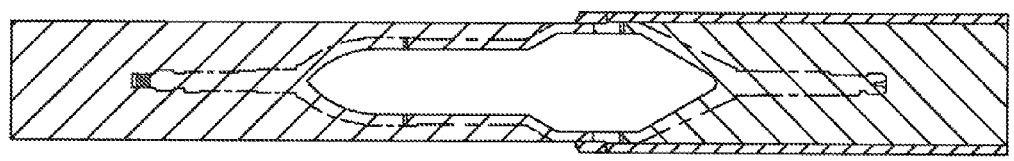
Figure 5C:
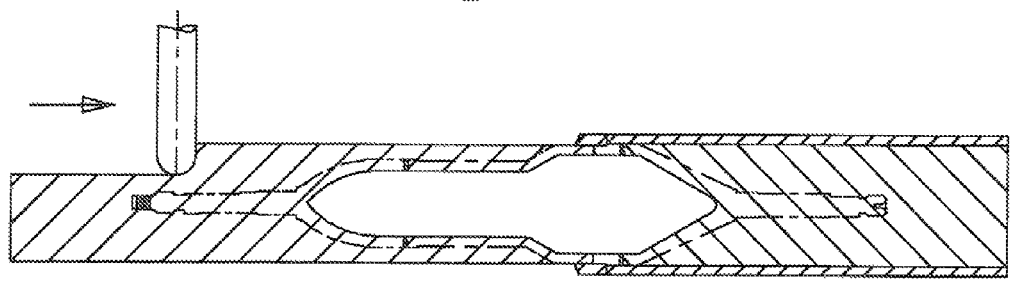
Figure 5D:
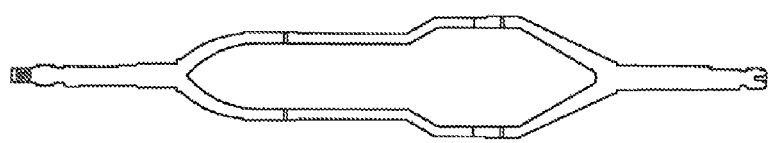

The two half section that are welded together to form the rotor shaft does not have the final outer shape of the hollow shaft sections. Instead, the two pieces used to form the hollow rotor shaft are formed from metallic blocks that have the inner surface of the hollow shaft already formed therein as seen in FIG. 5a. The half sections include at least a forward section and an aft section in which both sections have some of the hollow inner surface of the hollow rotor shaft formed therein. The forward and aft sections can be formed from a block of material or from an annular shaped material. The two half sections are preferably formed so that the weld is made within the larger diameter portion on the aft section. However, the weld joint can be formed anywhere within the hollow inner section. The forward and aft sections are joined together as seen in FIG. 5b, and then the outer surface of the rotor shaft is formed by removing material from the metallic half sections as seen in FIG. 5c until the outer surfaces of the hollow rotor shaft is formed. This process of starting with the metallic blocks and then removing the material to form the solid shaft ends and outer shaft surface will provide for the shaft ends 11 and 12 to be aligned for proper balance. FIG. 5d shows the finished hollow rotor shaft after all of the metallic material has been removed. In alternate embodiments, the shaft sections could be formed fro from blocks that have near outer shaft shapes so that less material needs to be removed in order to produce the finished hollow rotor shaft outer surface. The metallic blocks that are used to form the shaft can be formed from casting or machining. Also, the block halves or sections rectangular blocks as shown in FIG. 5a, but could be half sections that have almost the final outer rotor shaft surface shape so that less material is needed for removal from the welded half sections to form the finished outer rotor shaft shape. Enough material must be present in the half sections so that the finished rotor shaft is aligned and balanced enough.

The lip 25 is also the weld filler. With the two hollow sections 14 and 16 assembled together and aligned, an orbital weld (part to be welded stays static while the weld probe moves around the static part) is used to weld the two hollow sections together. An orbital weld is used in order to minimize the addition of added mass to the welded area so that unbalancing of the shaft from the welding process is minimized. The orbital weld is also used due to the cleanliness of the weld on the backside (underside or inner surface of the hollow shaft) of the shaft where the weld inspection is impossible to see. Using other welding techniques that add mass to the weld would produce large unbalances that would have to be machined away or accommodated in other ways. The part is pre-heated to 300 to 400 degrees F. prior to welding. The welding process should utilize the parent material for filler with 100% penetration required. Weld filler material can be AMS 5776 stainless steel grade 410.

The hollow rotor shaft can be formed from two or more sections that are welded together to form the single piece hollow rotor shaft of FIG. 1. In the embodiment in which two sections are used, each section will have at least one hole 22 and 23 to prevent an over-pressure of the inner hollow section to become too large that the hollow shaft will break open during the welding process. Also, the holes 22 and 23 are used to pass an insert gas (such as argon) through the inner hollow section during the orbital welding process in order to limit material buildup on the inner surface of the hollow section. Air could also be used but the weld would likely be less effective than using the Argon gas. Any uneven buildup on the inner surface of the hollow shaft after the shaft is welded together cannot be removed and can produce rotor dynamics problems such as an unbalanced rotor.

The welding process is an orbital welding process such as a Tungsten Insert Gas (TIG) weld or a metal insert gas (MIG) weld. Also, an electron beam (EB) weld can be used which is not an orbital welding process. In the inert gas orbital weld process for the present invention, the welding process can be performed under a vacuum or at atmospheric pressure. The holes 22 and 23 will limit the pressure buildup inside the hollow shaft during the welding process and prevent bulging or other damage to the shaft from the differential pressures.

After welding, a straightening process is performed. Then vacuum heat treatment at 1700 degrees F. (plus or minus 25 degrees F.) for 30 minutes with an argon fan to cool the part is performed. Then, vacuum heat treatment twice at 600 degrees F. (plus or minus 25 degrees F.) for 2 hours with argon fan cooling is performed.

To provide for extra balancing of the welded hollow rotor shaft 10 after the welding process has joined to the hollow sections together, material is removed from both hollow shaft sections around the area on which the two small diameter holes 22 and 23 appear. As seen in FIG. 1, the outer diameter of the hollow shaft sections in which the holes 22 and 23 appear have a slightly larger outer diameter than the adjacent hollow shaft sections 14 and 18. The width of the holes section 22 is about 0.5 inches with an extra thickness of 0.026 inches. The extra thickness of the hole section 23 is around 0.031 inches with a width slightly less than 0.5 inches. When the two hollow shaft sections are welded together, material can be removed from one or both of these hole sections 22 and 23 in order to further balance the hollow rotor shaft 10.

The holes 22 and 23 form the function of allowing gas to escape from the hollow interior space 20 during the orbital welding process so that a pressure differential formed on the hollow walls does not bend out and damage or prevent the weld from forming properly. The small diameter holes 22 and 23 equalize the pressures between the hollow interior 20 and the exterior of the shaft during the welding process. The hole diameter for both is from 0.058 inches to 0.068 inches in diameter.

In the embodiment of the present invention, the hollow shaft is joined at the larger diameter portion 16 as seen in FIG. 1 with reference numeral 21 being the weld. In this embodiment, the smaller diameter portion 14 is considered to be the forward or upstream end portion of the shaft and the larger diameter portion 16 is considered to be the aft or rearward or downstream portion of the shaft. However, the weld can be done at the smaller diameter portion 14. Also, the hollow rotor shaft can be made from three pieces that include the larger diameter portion, the smaller diameter portion, and the conical shaped portion that joins the smaller diameter to the larger diameter. Each of these three pieces can be joined using the orbital weld process described above. Each of the two joints would include the lip to aid in the assembly of the pieces prior to and during the welding process. In the embodiments in which the rotor shaft is formed from three or more portions, the last portion joined to form the single piece shaft will be considered to join the shaft between the forward end and the aft end. For example, if the small diameter portion is joined to the conical transition piece to form a single piece, and then joined to the larger diameter portion to form the single hollow rotor shaft, then the forward end of the shaft would be considered to include the smaller diameter portion and the conical portion while the aft end would be the larger diameter portion.

Figure 4:
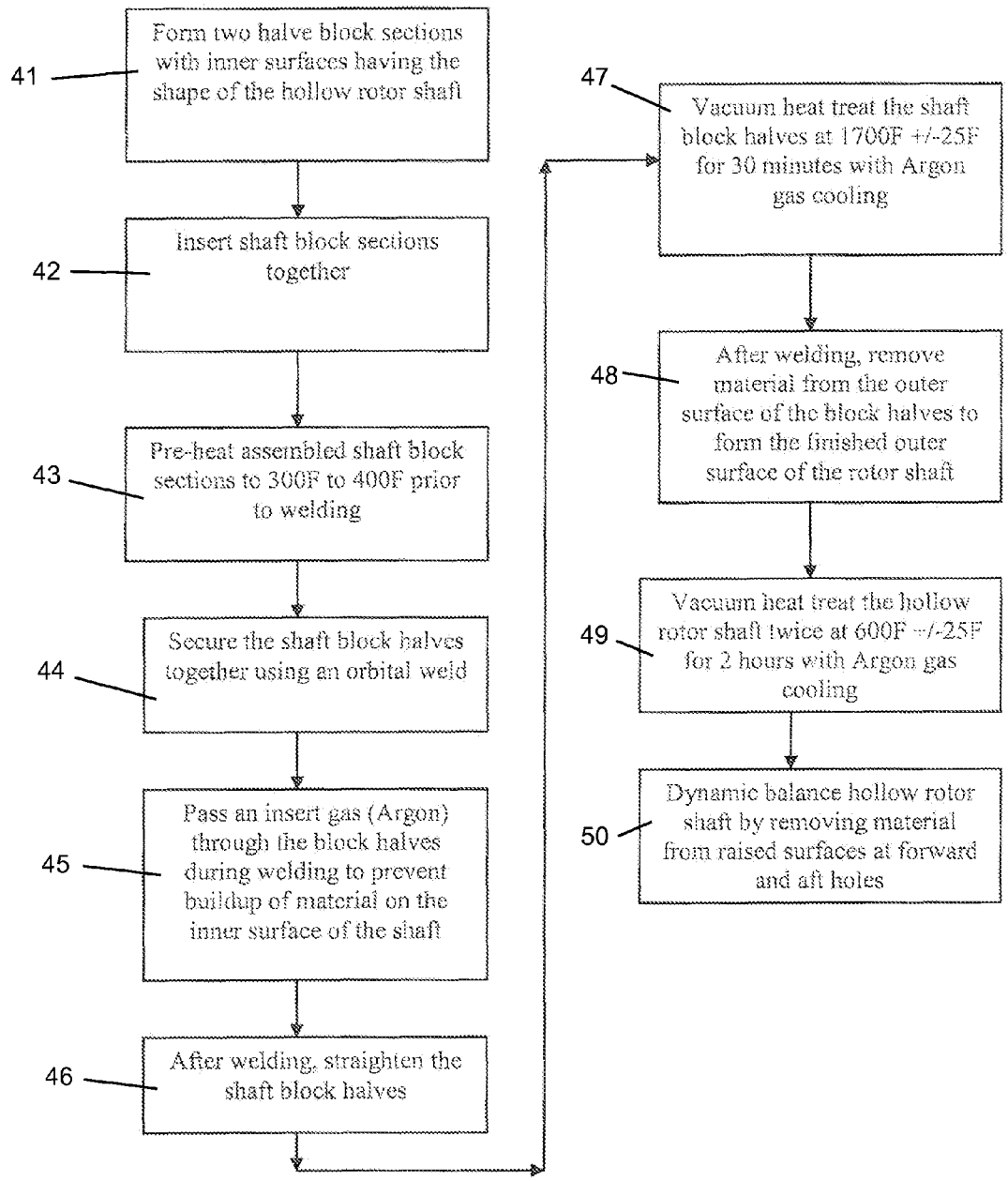
FIG. 4 shows a flow chart describing the steps of the process for assembling the hollow rotor shaft.

The process for forming the hollow rotor shaft 10 of the present invention is shown in the flow chart of FIG. 4. The forward and aft sections that represent the two halves of the rotor shaft are formed with the inner surface of the half sections forming the inner surface of the hollow rotor shaft (step 41). The forward and aft sections can be cast in this shape or machined from a solid section. The two half sections can have a block shaped or an annular shaped outer surface. The two half sections are tightly fitted together by the lip formed on one end so that the half sections remain together (step 42) during the next step of welding. The assembled half sections are pre-heated to a temperature of 300 F to 400 F (step 43), and then the half sections are welded together using an orbital weld (step 44). During the welding process, an insert gas such as argon is passed through the inner hollow surface of the two half sections to prevent the buildup of material on the inner surface of the hollow section that will be the inner hollow surface of the rotor shaft (step 45). After the welding process, the half sections can be straightened by bending the two ends (step 46). Next, the welded half sections are vacuum heat treated at 1700 F (+/−25 F) for around 30 minutes with the insert gas to cool the welded half sections (step 47). After the welded half sections have been cooled down, material from the outer surfaces of the half sections is removed to form the outer surface of the hollow rotor shaft (step 48). The machined hollow rotor shaft is then vacuum heat treated again twice at around 600 F (+/−25 F) for around 2 hours with the insert gas used to cool the shaft (step 49). Then, when the hollow rotor shaft is cooled, additional material can be removed from the two raised portion where the radial holes are placed in order to further balance the hollow rotor shaft. A hollow rotor shaft with solid ends for bearing supports capable of withstanding the high rotational speeds required in the small twin spool gas turbine engine is produced.

I claim the following:

1. A process for assembling a hollow rotor shaft together, comprising the steps of:
   forming a forward shaft section with a hollow inner surface;
   forming an aft shaft section with a hollow inner surface;
   welding the forward and the aft shaft sections together to form the inner surface of the hollow rotor shaft;
   removing material from the outer surfaces of the forward and aft sections to form the outer surface of the hollow rotor shaft; and,
   passing an insert gas through the inner hollow section to minimize a buildup of material on the inner surface of the hollow shaft.

2. The process for assembling a hollow rotor shaft together of claim 1, and further comprising the step of:
   welding the forward and aft sections together using an orbital weld.

3. The process for assembling a hollow rotor shaft together of claim 2, and further comprising the step of:
   the orbital welding process includes a tungsten insert gas weld or a metal insert gas weld.

4. The process for assembling a hollow rotor shaft together of claim 2, and further comprising the step of:
   pre-heating the shaft sections prior to welding.

5. The process for assembling a hollow rotor shaft together of claim 4, and further comprising the step of:
   vacuum heat treating the shaft sections after the weld is formed and before the outer shaft material is removed.

6. The process for assembling a hollow rotor shaft together of claim 5, and further comprising the step of:
   cooling the hot shaft sections with an inert gas after the weld is formed.

7. The process for assembling a hollow rotor shaft together of claim 6, and further comprising the step of:
   vacuum heat treat the hollow rotor shaft after the outer shaft material has been removed.

8. The process for assembling a hollow rotor shaft together of claim 7, and further comprising the step of:
   balancing the hollow rotor shaft by removing material from outer surface of the rotor shaft at the forward or the aft sections.

9. A process for assembling a hollow rotor shaft together, comprising the steps of:
   forming a forward shaft section with a hollow inner surface having a finished inner surface;
   forming an aft shaft section with a hollow inner surface having a finished inner surface;
   welding the forward and the aft shaft sections together; and,
   passing an insert gas through the hollow inner sections during the welding process to prevent the buildup of material on the inner surface of the hollow rotor shaft.

10. The process for assembling a hollow rotor shaft together of claim 9, and further comprising the step of:
    prior to the welding, pre-heating the two shaft sections.

11. The process for assembling a hollow rotor shaft together of claim 10, and further comprising the step of:
    after the welding step, vacuum heat treating the shaft sections at about 1700 degrees F.

12. The process for assembling a hollow rotor shaft together of claim 11, and further comprising the step of:
    cooling the shaft sections with an insert gas during the vacuum heat treating of the shaft sections.

13. The process for assembling a hollow rotor shaft together of claim 12, and further comprising the step of:
    removing material from the outer surfaces of the shaft sections to form the outer surface of the hollow rotor shaft.

14. The process for assembling a hollow rotor shaft together of claim 9, and further comprising the step of:
    removing material from the outer surfaces of the shaft sections to form the outer surface of the hollow rotor shaft.

15. The process for assembling a hollow rotor shaft together of claim 14, and further comprising the step of:
    after removing the material from the outer surfaces of the shaft sections, vacuum heat treating the shaft sections at least two times at around 600 degrees F.

16. The process for assembling a hollow rotor shaft together of claim 15, and further comprising the step of:
    while vacuum heat treating twice at around 600 degrees F., cooling the shaft sections with an insert gas.

17. The process for assembling a hollow rotor shaft together of claim 16 and further comprising the step of:
    dynamically balancing the hollow rotor shaft by removing material from outer portions of the shaft sections in either the forward or the aft sections.

18. A process for forming a hollow rotor shaft with closed ends comprising the steps of:
    forming a forward shaft section with an opened end and a closed end;
    forming an aft shaft section with an opened end and a closed end;
    forming a lip with an inner diameter on one of the ends and an outer diameter on the other of the two ends such that a snug fit between the two ends can occur;
    forming at least one hole in each of the forward shaft section and the aft shaft section to prevent an over-pressure within the hollow rotor shaft during a welding process; and,
    welding the forward and the aft shaft sections together to form the hollow rotor shaft.

19. The process for forming a hollow rotor shaft of claim 18, and further comprising the step of:
    forming a raised portion of the forward and aft shaft sections; and,
    balancing the hollow rotor shaft by removing material from one of the raised portions.

20. The process for forming a hollow rotor shaft of claim 19, and further comprising the step of:
    forming the holes in the raised portions.

21. The process for forming a hollow rotor shaft of claim 18, and further comprising the step of:
    welding the two shaft sections together with a minimal additional of material added to the hollow rotor shaft.

22. The process for forming a hollow rotor shaft of claim 21, and further comprising the step of:
    welding the two shaft sections together using an orbital weld or an electron beam weld.

23. A process for forming a hollow rotor shaft with closed ends comprising the steps of:
    forming a forward shaft section with an opened end and a closed end;
    forming an aft shaft section with an opened end and a closed end;
    forming a raised portion on each of the two shaft sections;
    welding the forward and the aft shaft sections together to form the hollow rotor shaft; and,
    balancing the hollow rotor shaft by removing material from one of the raised portions.

24. The process for forming a hollow rotor shaft of claim 23, and further comprising the step of:

forming a hole in each of the two raised portions prior to welding the two shaft ends together such that a pressure will not form within the hollow rotor shaft from welding that would plastically deform the hollow rotor shaft.

25. A process for assembling a hollow rotor shaft together, comprising the steps of:
forming a forward shaft section with an open end and a closed end and a finished inner surface;
forming an aft shaft section with an open end and a closed end and a finished inner surface;
forming a raised lip on an end of one of the forward and aft shaft surfaces such that a snug fit between the two ends can occur;
welding the forward and the aft shaft sections together; and,
removing the raised lip to form a smooth outer surface of the hollow rotor shaft.

26. The process for assembling a hollow rotor shaft together of claim 25, and further comprising the steps of:
forming a first raised portion on the forward shaft section prior to welding the two shaft sections together;
forming a second raised portion on the aft shaft section prior to welding the two shaft sections together;
after welding the two shaft sections together, removing material from one or both of the raised portions to balance the rotor shaft.

27. The process for assembling a hollow rotor shaft together of claim 26, and further comprising the step of:
forming a pressure vent hole in both of the raised portions of the two shaft sections prior to welding the two shaft sections together.

28. The process for assembling a hollow rotor shaft together of claim 27, and further comprising the step of:
passing a gas into an interior of the hollow rotor shaft through the two pressure vent holes during welding to minimize material buildup on the inner surfaces of the rotor shaft.

* * * * *